2 Sheets—Sheet 1.

E. WIARD & G. C. AVERY.
Sulky-Plow.

No. 204,517. Patented June 4, 1878.

Witnesses:
J. P. Theodore Lang
James Martin Jr.

Inventor:
Edward Wiard and
George C. Avery
by
Mason, Fenwick & Lawrence
his attorneys.

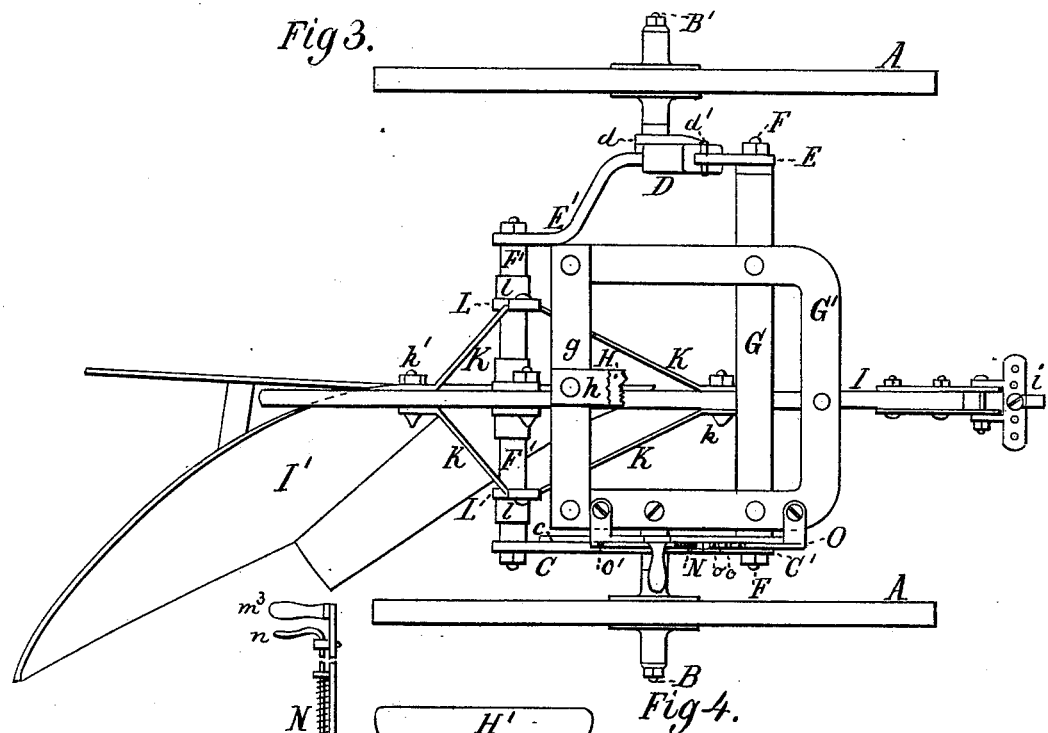
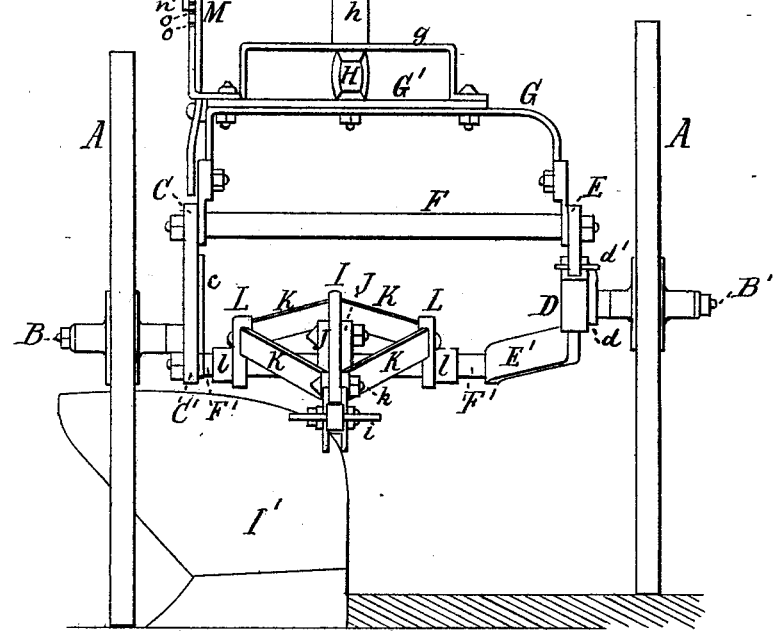
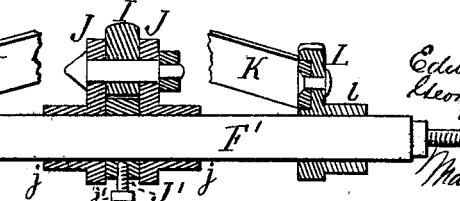

UNITED STATES PATENT OFFICE.

EDWARD WIARD AND GEORGE C. AVERY, OF LOUISVILLE, KENTUCKY, ASSIGNORS TO B. F. AVERY & SONS, OF SAME PLACE.

IMPROVEMENT IN SULKY-PLOWS.

Specification forming part of Letters Patent No. 204,517, dated June 4, 1878; application filed April 29, 1878.

*To all whom it may concern:*

Be it known that we, EDWARD WIARD and GEORGE C. AVERY, of Louisville, in the county of Jefferson and State of Kentucky, have invented certain new and useful Improvements in Sulky or Riding Plows; and we do hereby declare that the following is a full, clear, and exact description of the same, reference being had to the accompanying drawings, forming part of this specification, in which—

Figure 1:
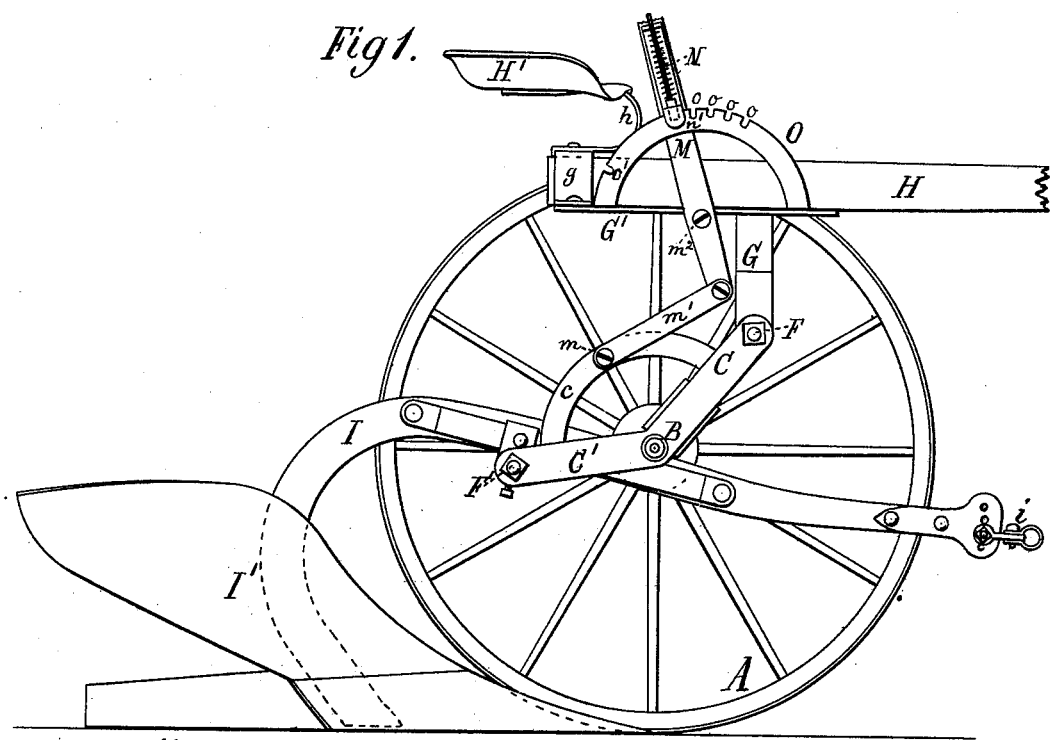
Figures 2, 5:
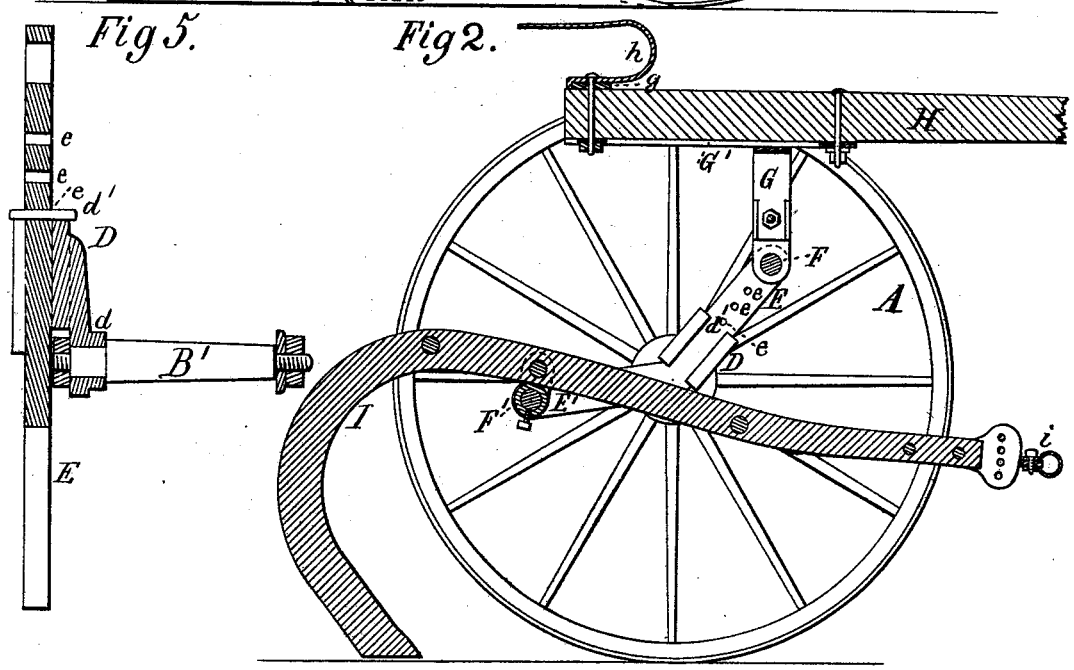

Figure 1 is a side elevation of our improved sulky or riding plow, one of the supporting-wheels being taken off its short axle-arm. Fig. 2 is a longitudinal section of the sulky or riding plow. Fig. 3 is a plan or top view of the same. Fig. 4 is a front view of the same. Fig. 5 is a detail longitudinal section of the adjustable axle and its attached slide and the double-crank-axle tree or frame. Fig. 6 is a detail section of the rear bar of the double-crank-axle tree or frame and the plow-beam and its confining and adjusting stop.

The nature of our invention consists in a sulky or riding plow provided with a double-crank-axle frame, the crank-arms of which are set to form an obtuse angle, and made to support the short axles of the supporting-wheels, while the rear connecting-bar between the rear crank-arms is made to serve as the support for the plow proper, and the front connecting-bar between the front crank-arms, together with the rear portion of one of the double-crank arms, is made to serve as the support for the frame, the tongue, and driver's seat, and also the lifting and controlling lever and its connections. By this construction the plow proper can be raised and lowered bodily by the driver with a single lever connected to the double-crank-axle frame, which carries the plow proper, and the crank-arms are made to afford, in the most advantageous manner, the necessary leverage for lifting the plow, and thus avoiding the use of chains, shafts, and other like complicated contrivances for elevating and lowering the plow while it is in use.

Our invention consists, second, in an adjustable axle-arm having a clasping or slotted slide attached to it, in combination with the perforated divergent arm of the double-crank axle-frame, and having automatic movement in one direction. By this combination all the advantages of the double-crank-axle frame are secured, and also the necessary adjustments, up or down, of the plow proper can be effected in a very convenient and expeditious manner.

Third. Our invention consists in the combination and particular arrangement of a brace or support between the two limbs of one of the double-crank arms, a connecting-rod pivoted to said brace, a lifting and controlling lever, and a vibrating support and frame for the tongue and driver's seat, whereby the whole adjustment and control of the plow proper while it is in use can be effected from the driver's seat with a single lever.

Fourth. Our invention consists in the combination, with the plow proper attached to the double-crank-axle frame, of the vibrating standard or support, loosely attached to the front connecting-bar of the double-crank-axle frame, the tongue plate or frame fastened in position where an ordinary-sized driver can balance the plow or about midway of its length to said standard, and to the tongue in front and rear of the standard, and the driver's seat mounted on the rear end of said tongue frame or plate. By this construction and arrangement the plow is balanced and undue weight transferred to the supporting axle arms or wheels thereon.

Our invention consists, fifth, in short tubular adjusting-brackets attached to the plow-beam, in combination with the rear bar of the double-crank-axle frame, a tubular stop, a set-screw, and auxiliary braces, whereby the plow is confined in position on the said bar, and can be adjusted to the right or left, and when adjusted can be secured firmly in position.

In the drawings, A represents the wheels whereby the plow and driver's seat are supported. B B' are the axles of the said wheels, B being fastened to the center of a double crank-arm, C C', and B' to the lug *d* of a slide, D, upon the arm E of a double crank-arm, E E'. The slide D is constructed to slide easily upon the arm E, and is sustained at different altitudes by means of a pin, $d'$, and holes $e$ in the said arm, the lowest altitude being such that the axle B' is in line with the axle B. The arms C C' and E E' are so united as to form obtuse angles in order to facilitate the operation of the slide D, as will be hereinafter explained. The extremities of the said crank-arms are connected by two transverse parallel bars, F F', of which the upper one, F, supports the seat and shaft or pole by means of a swinging angular bar, G, and a horizontal frame, G', having a rear transverse connection, $g$. The shaft or pole H of the sulky-plow is attached to the top of the front part of the frame G' and below the connection $g$, above which the supporting-spring $h$ of the driver's seat H' is fastened. To the lower bar F' a plow-beam, I, is attached by means of two short brackets, J, having sleeves $j$ fitted upon the bar. The space between the brackets J upon the bar is occupied by a sleeve or collar, J', with a set-screw, $j'$, whereby the plow-beam I and the plow I' may be adjusted laterally upon the bar F', while it may rock on it at any such position.

The plow-beam is stiffened by two double oblique brace-arms, K, fastened with their ends to the beam by means of screws or bolts $k$ $k'$, and having brackets L with sleeves $l$ fitted to the bar F'. The arms C C' are provided with a sector, $c$, in order to provide a suitable connection for a pin, $m$, and connecting-rod $m^1$ of an elevating hand-lever, M, which is pivoted at its fulcrum $m^2$ to the frame G', and which is provided with a spring-bolt, N, and a notched sector, O. The notches $o$ of the said sector answer the several elevations to which the plow is to be moved by the different inclinations of the lever M, and a notch, $o'$, is used for the elevation of the plow above the ground. The lever M has a horizontal handle, $m^3$, and the spring-bolt N has a similar handle or hook, $n$, in suitable proximity to the handle $m^3$, so that both may be operated at once and by one hand of the operator. An overhanging lug, $n'$, of the lever M keeps the lever close to the sector O. The plow-beam I is provided with an adjustable clevis, $i$, to which the team is attached.

Operation: When the plow is being drawn out into the field the slide D moves back as far as it will go upon the arm E, and may be secured in that position by inserting the pin $d'$ into the lowest hole $e$. The hand-lever M may then be swung back until the spring-bolt N enters the notch $o'$, whereby the plow becomes sufficiently elevated to pass over any impediments of a rough road or field. When plowing is to begin the plow is let down by swinging the hand-lever M forward and allowing the spring-bolt to enter one of the notches $o$, suitable for the desired depth of plowing. After the first row has been plowed the sulky-plow is adjusted by setting the slide D higher up upon the arm E and inserting the pin $d'$ in a higher hole, $e$. This is done to keep the plow parallel with the field when the wheel A on the land-side travels upon the higher elevation of the unplowed land, while the other wheel travels in the lower elevation of the furrow formed by the previously turned-up ground. Bowlders, stumps of trees, and other obstacles are avoided by quickly swinging back the hand-lever M.

The length of the arm E and the number of holes $e$ will in practice be such as to answer all the requirements of good even plowing. When the plow is elevated above the ground, as described, the arm E is about horizontal, so that the rolling friction of the wheel thereto attached will cause the slide D to automatically move back to the termination of its stroke, and the two wheels will travel with their axes in line with one another.

The bar F' or fulcrum of the plow-beam, whereby the plow is suspended, is placed at such point above and between the point and rear end of the plow that the plow is balanced in its operation, whereby the tilting or rocking to which that class of plows is subjected is avoided.

Having described our invention, what we claim as new, and desire to secure by Letters Patent, is—

1. The double-crank-axle frame, consisting of the arms C C' and E E', which form angles at or about the center of the wheels of the plow, the front and rear connecting-bars F and F', and the short axles B and B', one of which is adjustable, said frame being adapted for having the plow proper hung upon its rear bar and the tongue-support to rest and rock upon its front bar, substantially as and for the purpose described.

2. The adjustable axle-arm B', having the clasping or slotted slide attached to it, and connected to the divergent perforated arm E' of the double-crank-axle frame, as shown, so that when the plow proper is raised and the arm is nearly horizontal the slide with axle and wheel are capable of moving backward until the axle B' coincides with the axle B, substantially as and for the purpose described.

3. The rocking double-crank-axle frame having a brace or support, $c$, attached to it, in combination with the link $m^1$, lever M, rocking frame G G', and driver's seat, whereby facilities for raising the plow are afforded, and the weight of the driver, when on the seat, assists to lift the plow, substantially as described.

4. The combination of the short axles, one of which is adjustable, as described, double-crank-axle frame having arms which form angles at or about the center of the supporting-wheels, and the rocking support or seat-frame G G', substantially as and for the purposes described.

5. The combination of the tubular brackets

J J, attached to the beam of the plow and to the rear bar of the double-crank-axle frame, the tubular stop J' on said bar and between the tubes of the brackets, the set-screw j', and the braces K, substantially as and for the purposes described.

Witness our hands in the matter of our application for a patent for improvement in riding or sulky plows this 25th day of April, A. D. 1878.

EDWARD WIARD.
GEORGE C. AVERY.

Witnesses:
HENRY H. McDOUGALL,
GEORGE L. MILLER.